United States Patent
Wong

(10) Patent No.: US 7,127,448 B1
(45) Date of Patent: Oct. 24, 2006

(54) REFORMING QUERIES TO SELECTIVELY AUDIT ACCESSES TO ROWS WITHIN A RELATIONAL DATABASE

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/559,206

(22) Filed: Apr. 26, 2000

(51) Int. Cl.
    *G06F 17/30* (2006.01)

(52) U.S. Cl. .................. 707/2; 707/3; 707/4; 707/10
(58) Field of Classification Search .............. 707/3, 707/4, 8, 9, 10, 100
    See application file for complete search history.

(56) References Cited

U.S. PATENT DOCUMENTS

| | | | | |
|---|---|---|---|---|
| 5,404,509 A | * | 4/1995 | Klein | 707/101 |
| 5,428,737 A | * | 6/1995 | Li et al. | 707/4 |
| 5,600,206 A | * | 2/1997 | Cashin | 315/32 |
| 5,625,815 A | * | 4/1997 | Maier et al. | 707/8 |
| 5,725,240 A | * | 3/1998 | Kurita | 280/728.2 |
| 5,822,750 A | * | 10/1998 | Jou et al. | 707/2 |
| 5,864,750 A | * | 1/1999 | Fossaceca et al. | 455/144 |
| 5,940,819 A | * | 8/1999 | Beavin et al. | 707/2 |
| 5,987,455 A | * | 11/1999 | Cochrane et al. | 707/203 |
| 6,041,310 A | * | 3/2000 | Green et al. | 705/26 |
| 6,064,951 A | * | 5/2000 | Park et al. | 707/5 |
| 6,092,062 A | * | 7/2000 | Lohman et al. | 707/2 |
| 6,374,267 B1 | * | 4/2002 | Tam | 707/204 |
| 6,382,357 B1 | * | 5/2002 | Morrison et al. | 186/61 |
| 6,931,573 B1 | * | 8/2005 | Adams et al. | 714/38 |
| 2003/0014394 A1 | | 1/2003 | Fujiwara et al. | 707/3 |

FOREIGN PATENT DOCUMENTS

| | | |
|---|---|---|
| EP | 0 723 238 A1 | 7/1996 |
| WO | WO 99/52047 | 10/1999 |

OTHER PUBLICATIONS

Kenneth A. Ross. Conjuntive selection condition in main memory, (Synposium of Principles of Database System, year 2002, p. 109–120.□□.*

Beneventano et al. Description logics for semantic query optiminzation oin object–oriented database systems. ACM transaction on Database System (TODS), year 2003, p. 1–50.*

(Continued)

*Primary Examiner*—Kim Vu
*Assistant Examiner*—Baoquoc N To
(74) *Attorney, Agent, or Firm*—Park, Vaughan & Fleming, LLP

(57) ABSTRACT

One embodiment of the present invention provides a system that selectively audits accesses to a relational database. The system receives a query at the relational database and modifies the query so that processing the query causes an audit record to be created and recorded for rows in relational tables that are accessed by the query and that satisfy an auditing condition. Next, the system processes the modified query to produce a query result. This processing causes an audit record to be created for rows in relational tables that are accessed by the query and that satisfy the auditing condition. The system records the audit record in an audit record store, and then returns the query result. In one embodiment of the present invention, if the query includes a select statement, the system inserts a case statement into the select statement. This case statement calls a function that causes the audit record to be created and recorded if the auditing condition is satisfied. In a variation on this embodiment, the case statement is evaluated near the end of the query processing so that the case statement is evaluated only after other conditions of the query are satisfied. In this way, an audit record is created only for rows that are actually accessed by the query.

21 Claims, 3 Drawing Sheets

OTHER PUBLICATIONS

Llirbat et al. Eliminating costly redundant computations from SQL trigger executions. International Conference on Management of Data, year 1997, pp. 428–439.□□.*

Barry Lewis. Rules for Co–Existence of P—P and P–MP system uing diffkernet acess methods in teh same frequency band: ESTI TM4 Work Item DTR/TM04069. Year Apr. 26, 2000.*

Elder et al. Minutes: TC–10 Subcommittee on ADCs. year Sep. 30, 1999–Oct. 1, 1999.*

Bhargava et al. Relational database system with zero information loss, Knoweledge and Data Engineering, IEEE Transactions, date: 1993, pp. 76–87.*

Publication: "Access control in a relational data base management system by query modification" by Stonebraker and Wong, Proc.ACM Ann. Conf. San Diego, CA, Nov. 1974, pp. 180–187.

* cited by examiner

REFORMING QUERIES TO SELECTIVELY AUDIT ACCESSES TO ROWS WITHIN A RELATIONAL DATABASE

RELATED APPLICATION

The subject matter of this application is related to the subject matter in a co-pending non-provisional application by inventors Daniel ManHung Wong, Chon Hei Lei and Patrick F. Sack, filed on the same day as the instant application entitled, "Selectively Auditing Accesses to Rows Within a Relational Database at a Database Server," having Ser/No. 09/559,171, and filing date Apr. 26, 2000.

BACKGROUND

1. Field of the Invention

The present invention relates to providing security in computerized databases. More specifically, the present invention relates to a method and an apparatus for selectively auditing accesses to relational database tables based upon auditing conditions.

2. Related Art

Databases commonly store highly sensitive data, such as salaries, corporate financial data, and even classified military secrets. For security reasons it is essential to be able to audit accesses to this sensitive data. Conventional database systems typically provide a general auditing facility that records an audit trail containing general information about the user and the query issued.

However, conventional auditing facilities have a number of shortcomings. They do not record specific information about the application, the session environment or most importantly, the query results. Consequently, information gathered by a conventional auditing facility is frequently insufficient to reconstruct an event, or even to determine whether access rights have been violated.

In conventional relational database systems, auditing facilities only record information regarding which tables are accessed, not whether certain rows inside a given table are accessed. This table-level auditing tends to generate a large number of false audit records because many accesses to a given table do not touch sensitive data.

What is needed is an auditing mechanism that can specify a finer granularity of audit conditions during accesses to relational tables in order to minimize the number of false audit records that are generated.

Another problem in auditing database accesses arises in distributed database architectures, in which an application located on an application server sends a query to a database located on a database server. In this type of distributed architecture, auditing is typically performed by embedding customized auditing mechanisms into the application on the applications server, not at the database server. Relying on the application to perform auditing can give rise to many problems because a large number of applications can potentially access the database. Consequently, it is almost impossible to ensure that each one of these applications is configured to perform the auditing properly.

What is needed is an auditing mechanism for database accesses which does not rely on applications outside of the database server to perform auditing.

SUMMARY

One embodiment of the present invention provides a system that selectively audits accesses to a relational database. The system receives a query at the relational database and modifies the query so that processing the query causes an audit record to be created and recorded for rows in relational tables that are accessed by the query and that satisfy an auditing condition. Next, the system processes the modified query to produce a query result. This processing causes an audit record to be created for rows in relational tables that are accessed by the query and that satisfy the auditing condition. The system records the audit record in an audit record store, and then returns the query result.

In one embodiment of the present invention, if the query includes a select statement, the system inserts a case statement into the select statement. This case statement calls a function that causes the audit record to be created and recorded if the auditing condition is satisfied. In a variation on this embodiment, the case statement is evaluated near the end of the query processing so that the case statement is evaluated only after other conditions of the query are satisfied. In this way, an audit record is created only for rows that are actually accessed by the query.

In one embodiment of the present invention, the system retrieves the auditing condition for a table from a data structure associated with the table.

In one embodiment of the present invention, if the query modifies at least one entry in the relational database, the system uses a relational database system trigger to create and record the audit record for the modification to the relational database.

In one embodiment of the present invention, inserting the case statement into the query further involves a number of actions. The system first inserts the case statement into the query. Next, the system allows a query processor to allocate buffers for the query. The system then removes the case statement from the query and allows the query processor to generate a query plan for the query. The system schedules the case statement near the end of the query plan to ensure that the case statement is evaluated only after other conditions of the query are satisfied. In this way, the audit record is created only for rows that are actually accessed by the query.

In one embodiment of the present invention, the audit record includes, a user name for a user making the query, a time stamp specifying a time of the query and a text of the query.

In one embodiment of the present invention, the auditing condition includes a condition for a field within the relational database.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
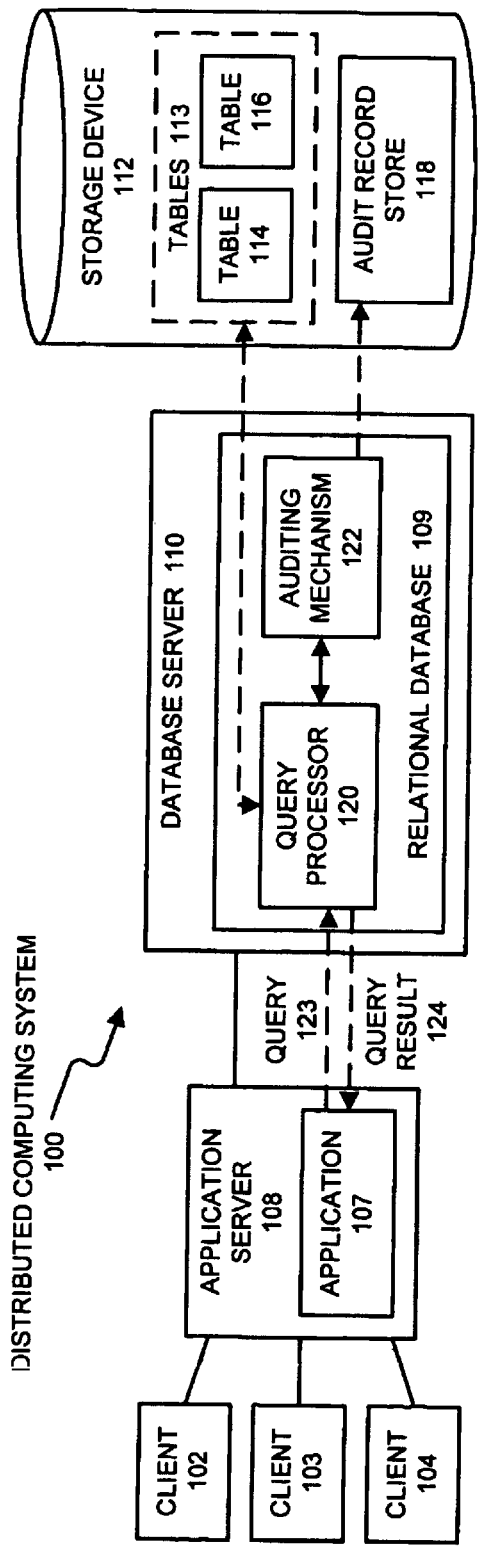
FIG. 1 illustrates a distributed computing system in accordance with an embodiment of the present invention.

FIG. 1 illustrates a distributed computing system 100 in accordance with an embodiment of the present invention. Distributed computing system 100 includes a number of computer systems (nodes), including clients 102–104, application server 108 and database server 110. Computer systems 102–104, 108 and 110 can generally include any type of computer system, including, but not limited to, a computer system based on a microprocessor, a mainframe computer, a digital signal processor, a personal organizer, a device controller, and a computational engine within an appliance.

Computer systems 102–104, 108 and 110 are coupled together by a computer network (not shown). This computer network can include any type of wire or wireless communication channel capable of coupling together computing nodes. This includes, but is not limited to, a local area network, a wide area network, or a combination of networks. In one embodiment of the present invention, this network includes the Internet.

Clients 102–104 can include any node on a network including computational capability and including a mechanism for communicating across the network. In the embodiment of the present invention illustrated in FIG. 1, clients 102–104 communicate with application 107 located on application server 108. Application 107 in turn communicates with relational database 109 on database server 110. Application server 108 and database server 110 can include any node on a computer network including a mechanism for servicing requests from a client for computational and/or data storage resources. Note that application server 108 serves as a client for database server 110.

Database server 110 contains relational database 109. Relational database 109 can generally include any type of database system designed around relation tables. Within relational database 109 there exist a number of mechanisms, including query processor 120 and auditing mechanism 122. Query processor 120 operates on a number of relational tables 113, including table 114 and table 116. Auditing mechanism 122 records audit records to audit record store 118.

Note that tables 113 and audit record store 113 reside on storage device 112, which is controlled by database server 110. Storage device 112 can include any type of non-volatile storage device, such as non-volatile storage devices based on magnetic, optical and/or magneto-optical storage devices. Storage device 112 can also include non-volatile semiconductor storage devices based on flash memory or battery-backed up random access memory. Note that copies of selected portions of tables 113 and audit record store 118 can also exist within memory in database server 110.

Table Structure

Figure 2:
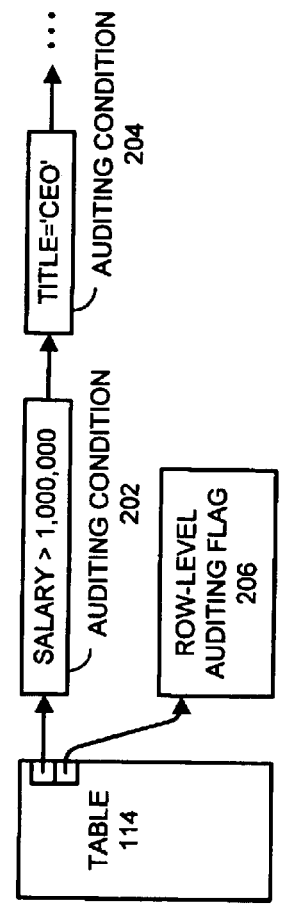
FIG. 2 illustrates a table within a relational database in accordance with an embodiment of the present invention.

FIG. 2 illustrates the structure of table 114 within relational database 119 in accordance with an embodiment of the present invention. Table 114 has the same structure as a typical table in a relational database, including a number of rows containing various fields.

Table 114 also includes a row-level auditing flag 206 which indicates whether auditing is enabled for the table. In another embodiment of the present invention, the system includes a database-wide row-level auditing flag, which enables row-level auditing for the entire relational database 109.

Table 114 is additionally associated with a number of auditing conditions, including auditing condition 202 "salary>1,000,000" and auditing condition 204 "title= 'CEO'". Auditing conditions 202 and 204 instruct relational database 109 to create an audit record for any rows that are accessed within table 114 that include a salary field with a value greater than 1,000,000, or that include a title field specifying a CEO. Accesses to other rows in table 114 that do not satisfy either of these auditing conditions do not cause an audit record to be generated.

Process of Auditing a Query

Figure 3:
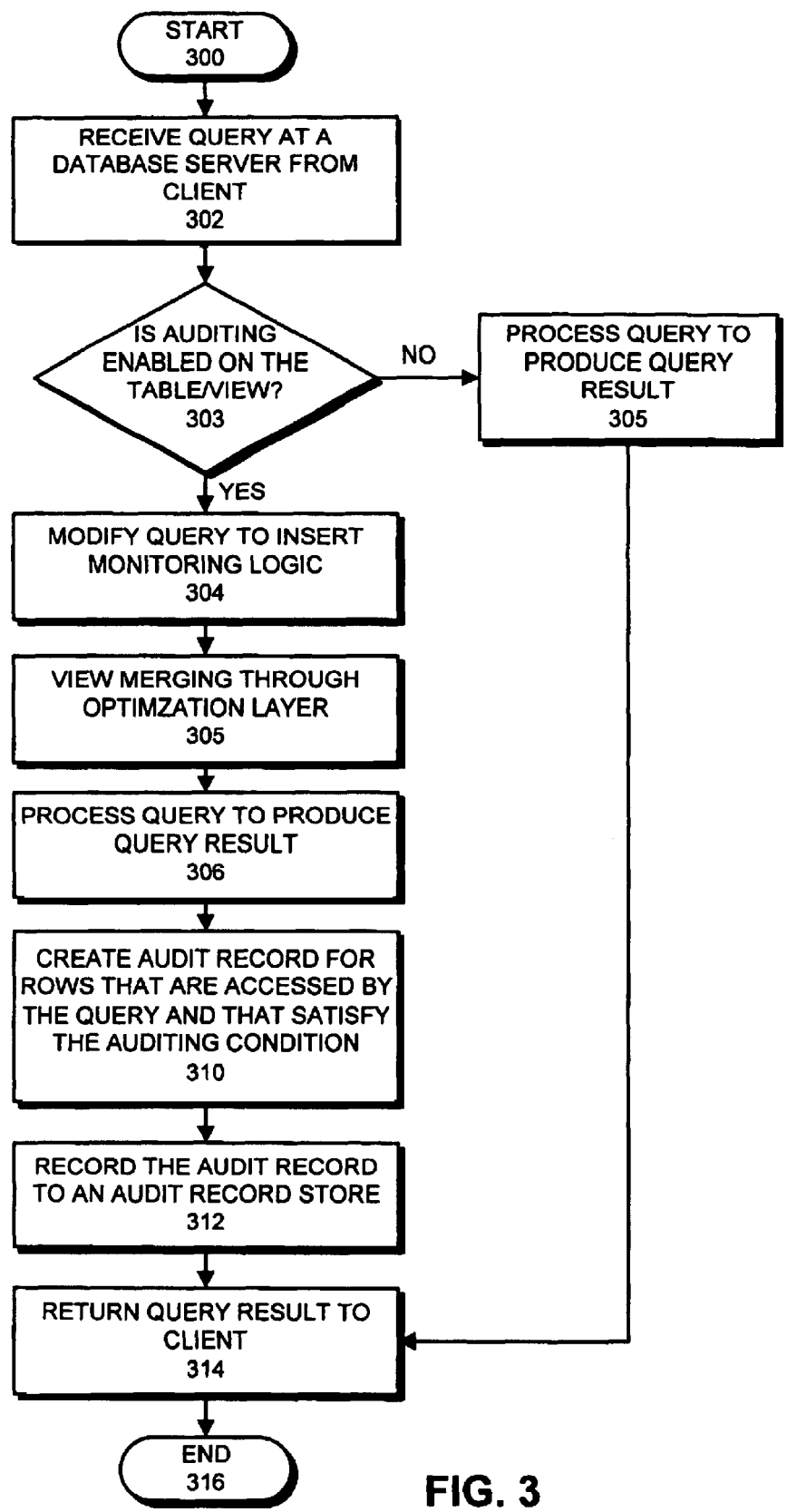
FIG. 3 is a flow chart illustrating the process of auditing a query in accordance with an embodiment of the present invention.

FIG. 3 is a flow chart illustrating the process of auditing a query in accordance with an embodiment of the present invention. The system starts by receiving a query 123 at relational database 109 within database server 110 from application 107 within application server 108 (step 302).

The system first determines if auditing is enabled by checking all tables referenced by the query to see if an auditing flag is set for the tables (step 303). If auditing is not enabled, the system processes query 123 as usual to produce a query result 124 (step 305), and then returns query result 124 (step 314).

If auditing is enabled, the system modifies the query by inserting monitoring logic into query 123 (step 304). This monitoring logic causes an audit record to be created and recorded for any rows that satisfy an auditing condition.

In one embodiment of the present invention, query 123 is modified by inserting statements into query 123 to make query 123 call a function that creates and records auditing records if a row in a table satisfies the auditing conditions.

In another embodiment of the present invention, modifying query 123 involves creating two separate queries. A first query additionally includes restrictions based on the auditing conditions. This query produces audit records only for rows that satisfy the auditing conditions. A second query is unmodified from the initial query and is used to produce the query result.

In one embodiment of the present invention, the auditing condition is specified for the entire relational database 109. In another embodiment, the auditing condition is specified on a table-by-table basis.

Next, the optimization layer performs view merging (step 305), and the system processes query 123 to produce the query result 124 (step 306). In doing so, the system creates an audit record for rows that are accessed by query 123 and that satisfy the auditing condition (step 310). Alternatively, the audit record can be produced by running a second query at a later time to produce the audit record.

Note that the audit record includes a user name for a user making the query, a time stamp specifying a time of the query, a text of the query and specific variable bindings for the query.

The system then records the audit record in audit record store 118 (step 312) and then returns the query result 124 to application 107 (step 314).

Process of Reforming a Query

Figure 4:
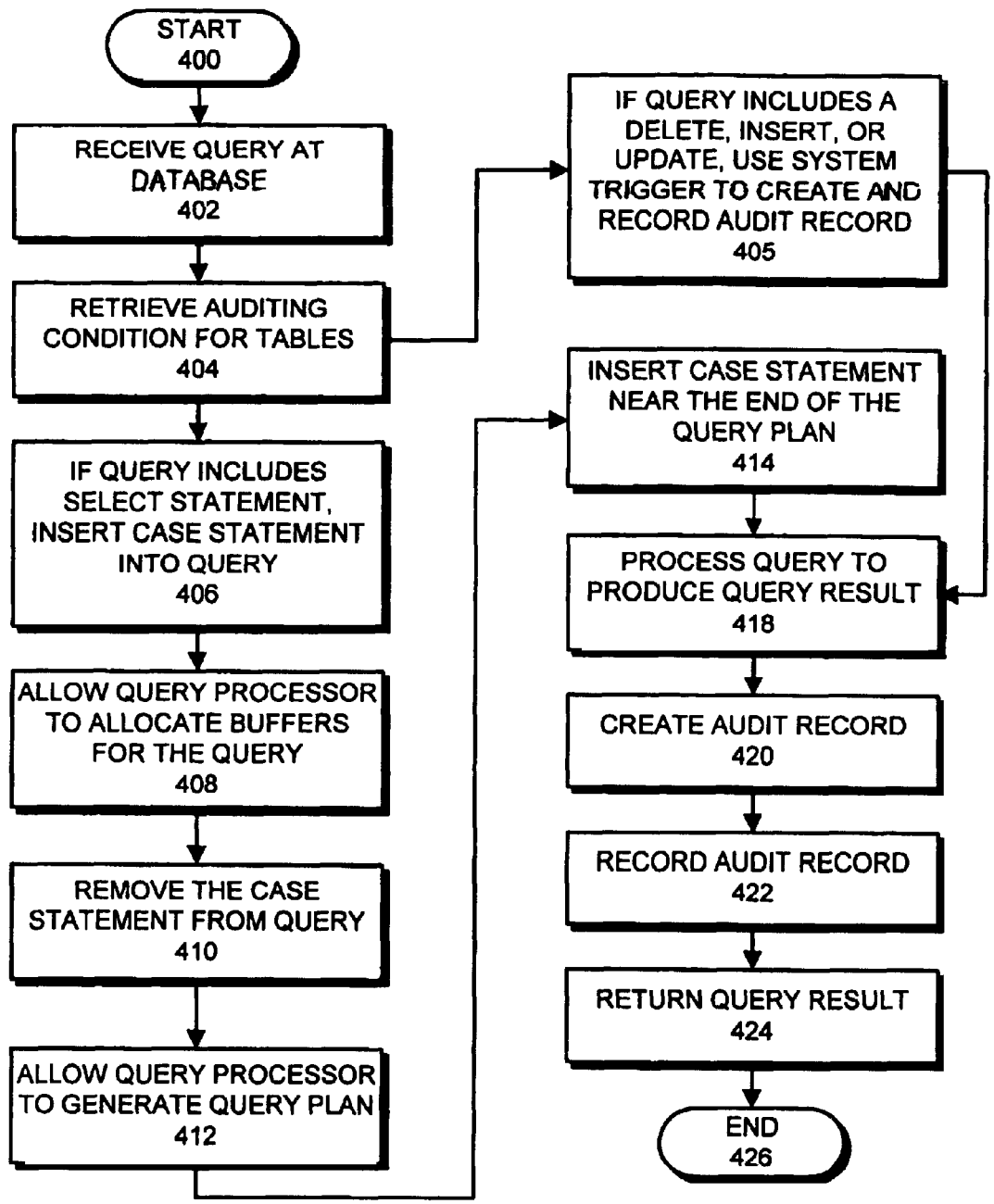
FIG. 4 is a flow chart illustrating the process of reforming a query for auditing purposes in accordance with an embodiment of the present invention.

FIG. 4 is a flow chart illustrating the process of reforming a query for auditing purposes in accordance with an embodiment of the present invention. The system starts by receiving a query 123 at relational database 109 (step 402). The system next retrieves any auditing conditions that might exist for tables involved in query 123, such as auditing conditions 202 and 204 associated with table 114 (step 404).

If query 123 includes a statement that modifies a table within relational database 109, such as a delete statement, an insert statement or an update statement, the system uses pre-existing triggers in the database system to create audit records for these statements (step 405). Note that a database system generally maintains a log of changes to database tables, so providing an auditing mechanism for these changes in addition to the log may be unnecessary. The system then processes query 123 to produce query result 124 (step 418).

If query 123 includes a select statement, the system appends a case statement to query 123 for each auditing condition using a view expansion mechanism (step 406). For example, suppose that the auditing condition is DEPT='SALES' and that query 123 is, SELECT*FROM payroll WHERE salary>150,000;

The system appends a case statement to the select statement as follows.

SELECT*FROM
 (
  SELECT*FROM payroll
  WHERE (CASE WHEN (dept='sales') THEN
   SYS_AUDIT( )
   ELSE NOT NULL END) IS NOT NULL;
 )
 WHERE salary>150,000

In this example, the case statement will cause the SYS_AUDIT( ) function to be called if the auditing condition is satisfied. This SYS_AUDIT( ) function causes an audit record to be created and recorded.

Note that the function SYS_AUDIT( ) always returns NOT NULL (unless an error condition arises within SYS_AUDIT( ). Therefore the predicate is always evaluated as TRUE. Hence, the predicate does not affect the logic of query 123, and the predicate can be safely applied to query 123.

Next, the query processor is allowed to allocate buffers for query 123 (step 408). After the buffers are allocated, the system removes the case statement from query 123 (step 410). In one embodiment of the present invention, this involves moving a query filter list data structure that refers to the predicate to a temporary location in the query block data structure that contains all the meta-information for query 123. Moving the predicate in this way prevents the optimizer from reorganizing the CASE clause and query plan layer to allocate row source for the CASE clause.

After optimization, the system generates a query plan for query 123 to specify an order in which the operations involved in query 123 are carried out (step 412).

After the query plan is generated (but before generating the execution plan for any "GROUP BY" clause that may exist) the system generates an execution plan for the case statement so that the case statement is evaluated only for rows that satisfy all the preceding conditions in query 123 (step 414). In this way, an audit record is created only for rows are accessed by query 123. Next, the system processes query 123 to produce query result 124 (step 418). This causes an audit record to be created (step 420) and recorded (step 422) for each row that satisfies the conditions of query 123 as well as the auditing conditions.

Finally, the system returns query result 124 to the entity that issued query 123 (step 424).

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for selectively auditing accesses to a relational database, comprising:
 receiving a query for the relational database;
 selectively auditing an access to the relational database,
  wherein selectively auditing the access involves automatically modifying the query prior to processing the query,
  wherein an auditing condition for the selective auditing specifies a condition based on a value of a field in a row in the relational database, and
  wherein satisfying the auditing condition allows selective auditing of the query,
 processing the modified query to produce a query result, wherein processing the modified query includes:
  creating audit records only for rows in relational tables accessed by the query and that satisfy the auditing condition, and
  recording the audit records in an audit record store; and
 returning the query result;
 wherein if the query modifies at least one entry in the relational database, using a relational database system trigger to create and record the audit record for the modification to the relational database.

2. The method of claim 1, further comprising ensuring the case statement is evaluated near the end of the query processing so the case statement is evaluated only after other conditions of the query are satisfied.

3. The method of claim 1, wherein the audit record includes:
 a user name for a user making the query;
 a time stamp specifying a time of the query; and
 a text of the query.

4. The method of claim 1, wherein the auditing condition includes a condition for a field within the relational database.

5. The method of claim 1, further comprising retrieving the auditing condition for a given table from a data structure associated with the given table.

6. A computer-readable storage medium storing instructions to be executed by a computer causing the computer to perform a method for selectively auditing accesses to a relational database, comprising:
 receiving a query for the relational database;
 selectively auditing an access to the relational database, wherein selectively auditing the access involves automatically modifying the query prior to processing the query, wherein an auditing condition for the selective auditing specifies a condition based on a value of a field in a row in the relational database, and wherein satisfying the auditing condition allows selective auditing of the query, processing the modified query to produce a query result, wherein processing the modified query includes:

creating audit records only for rows in relational tables accessed by the query and that satisfy the auditing condition, and recording the audit records in an audit record store; and returning the query result;

wherein if the query modifies at least one entry in the relational database, the method further comprises using a relational database system trigger to create and record the audit record for the modification to the relational database.

7. The computer-readable storage medium of claim 6, wherein the method further comprises ensuring the case statement is evaluated near the end of the query processing so the case statement is evaluated only after other conditions of the query are satisfied.

8. The computer-readable storage medium of claim 6, wherein the method further comprises retrieving the auditing condition for a given table from a data structure associated with the given table.

9. The computer-readable storage medium of claim 6, wherein the audit record includes:

a user name for a user making the query;

a time stamp specifying a time of the query; and a text of the query.

10. The computer-readable storage medium of claim 6, wherein the auditing condition includes a condition for a field within the relational database.

11. An apparatus for selectively auditing accesses to a relational database, comprising:

a receiving mechanism configured to receive a query for the relational database;

a selective auditing mechanism configured to selectively audit an access to the relational database, wherein selectively auditing the access involves automatically modifying the query prior to processing the query, wherein an auditing condition for the selective auditing specifies a condition based on a value of a field in a row in the relation database, and wherein satisfying the auditing condition allows selective auditing of the query, a query processor configured to process the modified query to produce a query result, wherein processing the modified query includes:

creating audit records only for rows in relational tables accessed by the query and that satisfy the auditing condition, and recording the audit records in an audit record store; and a returning mechanism that is configured to return the query result;

wherein is the query modifies at least one entry in the relational database, the apparatus uses a relational database system trigger to create and record the audit record for the modification to the relational database.

12. The apparatus of claim 11, wherein the query modification mechanism is configured to ensure the case statement is evaluated near the end of the query processing so the case statement is evaluated only after other conditions of the query are satisfied.

13. The apparatus of claim 11, wherein the query modification mechanism is configured to retrieve the auditing condition for a given table from a data structure associated with the given table.

14. The apparatus of claim 11, wherein the audit record includes:

a user name for a user making the query;

a time stamp specifying a time of the query; and a text of the query.

15. The apparatus of claim 11, wherein the auditing condition includes a condition for a field within the relational database.

16. A computer-implemented method for selectively auditing accesses to a relational database, comprising:

receiving a database operation for the relational database;

selectively auditing an access to the relational database based on an auditing condition, wherein the auditing condition for the selective auditing specifies a condition based on a value of a field in a row in the relational database;

processing the database operation to produce a database operation result, wherein processing the database operation includes:

creating audit records only for selected rows in the relational database that are accessed by the database operation and that satisfy the auditing condition, and recording the audit records in an audit record store; and returning the database operation result;

wherein selectively auditing the access involves automatically modifying the database operation prior to processing the database operation, wherein satisfying the auditing condition allows selective auditing of the database operation and not for other rows;

wherein satisfying the auditing condition allows selective auditing of the database operation; and wherein if the database operation modifies at least one entry in the relational database, using a relational database system trigger to create and record the audit record for the modification to the relational database.

17. The method of claim 16 wherein the auditing condition includes a condition for at least two fields within the relational database.

18. A computer-readable storage medium storing instructions that when executed by a computer cause the computer to perform a method for selectively auditing accesses to a relational database, the method comprising:

receiving a database operation for the relational database;

selectively auditing an access to the relational database based on an auditing condition, wherein the auditing condition for the selective auditing specifies a condition based on a value of a field in a row in the relational database;

processing the database operation to produce a database operation result, wherein processing the database operation includes:

creating audit records only for selected rows in the relational database that are accessed by the database operation and that satisfy the auditing condition, and recording the audit records in an audit record store; and returning the database operation result;

wherein selectively auditing the access involves automatically modifying the database operation prior to processing the database operation, wherein satisfying the auditing condition allows selective auditing of the database operation and not for other rows;

wherein satisfying the auditing condition allows selective auditing of the database operation; and wherein if the database operation modifies at least one entry in the relational database, using a relational database system trigger to create and record the audit record for the modification to the relational database.

19. The computer-readable storage medium of claim 18, wherein the auditing condition includes a condition for at least two fields within the relational database.

20. An apparatus for selectively auditing accesses to a relational database, comprising:

a receiving mechanism configured to receive a database operation for the relational database;

a selective auditing mechanism configured to selectively audit an access to the relational database based on an auditing condition, wherein the auditing condition for the selective auditing specifies a condition based on a value of a field in a row in the relational database;

a processing mechanism configured to process the database operation to produce a database operation result;

a creating mechanism configured to create audit records only for selected rows in the relational database that are accessed by the database operation and that satisfy the auditing condition, and a recording mechanism configured to record the audit records in an audit record store; and a returning mechanism configured to return the database operation result;

wherein selectively auditing the access involves automatically modifying the database operation prior to processing the database operation, wherein satisfying the auditing condition allows selective auditing of the database operation and not for other rows;

wherein satisfying the auditing condition allows selective auditing of the database operation; and wherein if the database operation modifies at least one entry in the relational database, the apparatus uses a relational database system trigger to create and record the audit record for the modification to the relational database.

21. The apparatus of claim 20, wherein the auditing condition includes a condition for at least two fields within the relational database.

* * * * *

UNITED STATES PATENT AND TRADEMARK OFFICE
CERTIFICATE OF CORRECTION

PATENT NO. : 7,127,448 B1
APPLICATION NO. : 09/559206
DATED : October 24, 2006
INVENTOR(S) : Daniel ManHung Wong It is certified that error appears in the above-identified patent and that said Letters Patent is hereby corrected as shown below:

(at column 7, line 49), please delete the word, "relation" and replace with the word --relational--.

(at column 7, line 60), please delete the words, "that is".

Signed and Sealed this

Ninth Day of January, 2007

JON W. DUDAS
*Director of the United States Patent and Trademark Office*